(12) United States Patent
Backfried et al.

(10) Patent No.: US 6,801,893 B1
(45) Date of Patent: Oct. 5, 2004

(54) METHOD AND APPARATUS FOR EXPANDING THE VOCABULARY OF A SPEECH SYSTEM

(75) Inventors: Gerhard Backfried, Purkersdorf (AT); Hubert Crépy, Boulogne (FR)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 09/599,129

(22) Filed: Jun. 22, 2000

(30) Foreign Application Priority Data

Jun. 30, 1999 (EP) .......................................... 99112441

(51) Int. Cl.$^7$ .............................................. G10L 15/18
(52) U.S. Cl. ...................... 704/257; 704/251; 704/270
(58) Field of Search ............................... 704/257, 251, 704/270

(56) References Cited

U.S. PATENT DOCUMENTS

| | | | | |
|---|---|---|---|---|
| 4,763,278 A | * | 8/1988 | Rajasekaran | 704/251 |
| 4,852,170 A | * | 7/1989 | Bordeaux | 704/277 |
| 5,212,730 A | | 5/1993 | Wheatley et al. | |
| 5,467,425 A | * | 11/1995 | Lau | 704/243 |
| 5,623,578 A | * | 4/1997 | Mikkilineni | 704/255 |
| 5,680,511 A | * | 10/1997 | Baker | 704/257 |
| 5,852,801 A | * | 12/1998 | Hon | 704/244 |
| 5,873,061 A | * | 2/1999 | Hab-Umbach | 704/254 |
| 5,905,773 A | * | 5/1999 | Wong | 379/88.03 |
| 6,073,097 A | * | 6/2000 | Gould | 704/251 |
| 6,076,060 A | * | 6/2000 | Lin | 704/260 |
| 6,490,561 B1 | * | 12/2002 | Wilson | 704/251 |

FOREIGN PATENT DOCUMENTS

WO   WO 98/45834 A   10/1998

OTHER PUBLICATIONS

Aarati D. Parmar, "A Semi–Automatic System for the Syllabification and Stress Assignment of Large Lexicons," Master Thesis, http://www.sls.lcs.mit.edu/sls/publications/index.html, MIT, pp. 1–116, Jun. 1997.
N. Deshmukh et al., "An Advanced System to Generate Pronunciations of Proper Nouns," pp. 1467–1470, Apr. 1997.
J.M. Lucassen et al., "An Information Theoretic Approach to the Automatic Determination of Phonemic Baseforms," Proc. of ICASSP–84,—42.5.1–42.5.4, 1982.
F. Jelinek et al., "Interpolated Estimation of Markov Source Parameters from Sparse Data," Proc. of the Workshop on Pattern Recognition in Practice, North–Holland Publishing Company, 1980.

* cited by examiner

Primary Examiner—Vijay Chawan
(74) Attorney, Agent, or Firm—Thu Ann Dang

(57) ABSTRACT

A computerized method is provided for adding a new word to a vocabulary of a speech system, the vocabulary comprising words and corresponding acoustic patterns for a language or language domain. Within a determination step for the new word, a regularity value is determined which measures the conformity with respect to the pronunciation in the language or language domain. In a comparison step, the regularity value is compared to a threshold value to decide whether the conformity is insufficient. Only in the affirmative case of insufficient conformity, a prompting step is performed, prompting for additional information on the pronunciation of the new word. Finally, in an extension step, the new word and an acoustic pattern of the new word are added to the vocabulary.

24 Claims, 4 Drawing Sheets

FIG.3 HISTOGRAM OF WORD PERPLEXITIES AGAINST TRI-LETTER LM

METHOD AND APPARATUS FOR EXPANDING THE VOCABULARY OF A SPEECH SYSTEM

FIELD OF THE INVENTION

The present invention relates in general to improved speech systems. More particularly the present invention relates to a method and apparatus for adding new words with yet unseen spellings and pronunciations to the vocabulary of a speech system.

BACKGROUND OF THE INVENTION

Today's speech recognition systems, such as "command and control" or "dictation" systems, all typically contain predefined vocabularies, consisting of words, their pronunciations and some model of the usage of these words described by a language model. State-of-the-art systems may contain several tens of thousands of such entries which are used at runtime to determine what is being said.

Regardless of the size of the vocabulary, all systems suffer from the fact that they offer only a limited, fixed vocabulary to the user. The fact that commercially available systems typically only contain full form vocabularies (i.e., they do not model separately the morphology of the language) further limits the effective scope of today's vocabularies. This is especially limiting for highly inflective languages such as French, German or Slavic languages. Consequently almost every user will need to add to this vocabulary their own special terms, names or expressions to fit their individual needs. Being able to extend the base vocabulary with specific terms thus becomes an important issue and frequent activity when using speech recognition systems. From a principle point of view, the language vocabularies have to be viewed as "open or living systems" which never can comprise all possible words of a certain language; in addition, technical limitations (storage requirements and processing load) make it even more impossible to achieve this goal. Thus the methodology and quality of the process to extend a certain vocabulary with new words is an important success factor of speech systems.

The pronunciations of words in a vocabulary are typically stored as phonetic transcriptions (be it phonemes, sub-phonemes or combinations of phonemes). Adding new words to the vocabulary requires the generation of such phonetic transcriptions (pronunciations) to allow for the subsequent recognition of these words. It is imperative that a speech recognition system build adequate acoustic models for these new words, as recognition accuracy is strongly dependent on the quality of these models. Generating inadequate models is likely to result in degraded overall performance and lower recognition accuracy of the system. Therefore, any improvement of the methodology and quality of this extension process is of great importance.

According to the current state of the art, a word is typically added to the system by having the user type in the new word and constructing, from the spelling (and most often a sound sample, i.e., the user pronouncing the new word), a new acoustic pattern to be used in future recognition. An algorithmic or statistical system, broadly called a "Letter-to-Sound System" (LTS), is used to derive the most likely pronunciation(s) of the sequence of letters composing the orthographic representation of the word. In general, a Letter-To-Sound System maps individual letters or combinations of letters to a sequence of phonemes which match their pronunciation. Frequently, a statistical approach is used to generate such systems. An important example for the statistical approach are CARTs (classification and regression trees). The results generated by a LTS are then combined with the acoustics provided by the user to generate the actual pronunciation(s). A detailed description of one example of how a statistical system may be employed for this task is taught by J. M. Lucassen and R. L. Mercer "An Information Theoretic Approach to the Automatic Determination of Phonemic Baseforms," Proc. of ICASSP-84, 42.5.1–42.5.4, 1982, the disclosure of which is incorporated by reference herein.

Frequently, however, the words added are words derived of a foreign language, customers' names, acronyms, or technical terms generally not obeying the pronunciation rules of the language per se. This is likely to result in inferior pronunciations being generated which will cause frequent misrecognitions when running the system, thus degrading the overall performance and quality of the speech system. Sophisticated systems may detect that the acoustics provided (for instance, by the user pronouncing the word) do not match the generated candidate pronunciations and prompt the user for some additional input. However, since users of these systems usually are not phoneticians or even versed in phonetics, it is important, both from a usability and efficacy point of view to limit their involvement in the generation of these pronunciations to a minimum.

Some systems allow to specify a "sounds-like-spelling" (SLS) pattern (a pseudo-spelling of the word that corresponds to the way the word is pronounced in the given language, like "eye-triple-ee" for English for the word "IEEE") to support this process. This approach puts the onus on the user to determine whether the word to be added indeed follows the standard pronunciation rules or not, and to provide an alternative spelling that does. These rules are not clearly defined and may even vary within subdomains of a language. This approach tends to break down with users who are either not very careful, not very familiar with the language and/or domain or who are not very well versed in phonetics.

Letter-to-Sound Systems are also used in various other applications of speech systems, such as speech synthesis of words that are not in the basic lexicon. Like speech recognition systems, these "text-to-speech" synthesis systems (TTS) are faced with a similar difficulty when trying to generate the pronunciation of a word that is not in their basic lexicon.

To demonstrate the urgency of improvements in this area, reference is made for instance to the "Angie" framework (an example of a Letter-to-Sound System) description in Aarati D. Parmar—master Thesis, MIT 97, A Semi-Automatic System for the Syllabification and Stress Assignment of Large Lexicons, available at: http://www.sls.lcs.mit.edu/sls/publications/index.html. In this experiment, on the TIMIT database, 10 words out of 2500 failed to generate a correct pronunciation because of "irregular spelling" or "failed letter rules." And this test set even does not include acronyms, or anything of the like which are likely to be encountered in everyday business environments.

SUMMARY OF THE INVENTION

The present invention provides an improved method and apparatus for adding new words with yet unseen spellings and pronunciations to a vocabulary of a speech system.

In one aspect of the invention, a computerized method is provided for adding a new word to a vocabulary of a speech system, the vocabulary comprising words and corresponding acoustic patterns for a language or language domain. Within a determination step for the new word, a regularity value is determined which measures the conformity with respect to the pronunciation in the language or language domain. In a comparison step, the regularity value is compared to a threshold value to decide whether the conformity is insufficient. Only in the affirmative case of insufficient conformity, a prompting step is performed, prompting for additional information on the pronunciation of the new word. Finally, in an extension step, the new word and an acoustic pattern of the new word are added to the vocabulary.

The present invention provides an automatic determination of the regularity of a proposed word with respect to the standard pronunciation of the language. This lowers the requirement for attention and skills on the user's part in the extension process of a vocabulary. It is neither left up to the user when additional information concerning the pronunciation of a new word is to be introduced to the speech system, nor is this additional information omitted when it is needed. Otherwise, in both cases, the construction of inferior pronunciation models would be the consequence. As the recognition accuracy is strongly dependent on the quality of these models, the inventive teachings result in an improved overall performance and higher recognition accuracy of the speech system. The quality of the generated pronunciations in speech systems is improved.

Furthermore, as a user's involvement by prompting him for additional information with respect to the pronunciation is reduced to a minimum, the user-interface can be kept simpler and the user will not have to be exposed to unneeded complexity. As words likely to be pronounced in a standard way do not require further action, valuable time-savings are the result. This is a major selling argument for typical clients using speech recognition systems such as lawyers and medical doctors.

The present invention is inherently language and domain independent and may thus be applied to a variety of languages and domains without further extension. This property is of specific advantage in view of the large number of different languages and language domains which all can be supported with a single solution approach.

Finally, the reduced number of failures during adding new words to a vocabulary leads to a reduced user frustration and an improved perception of system usability.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
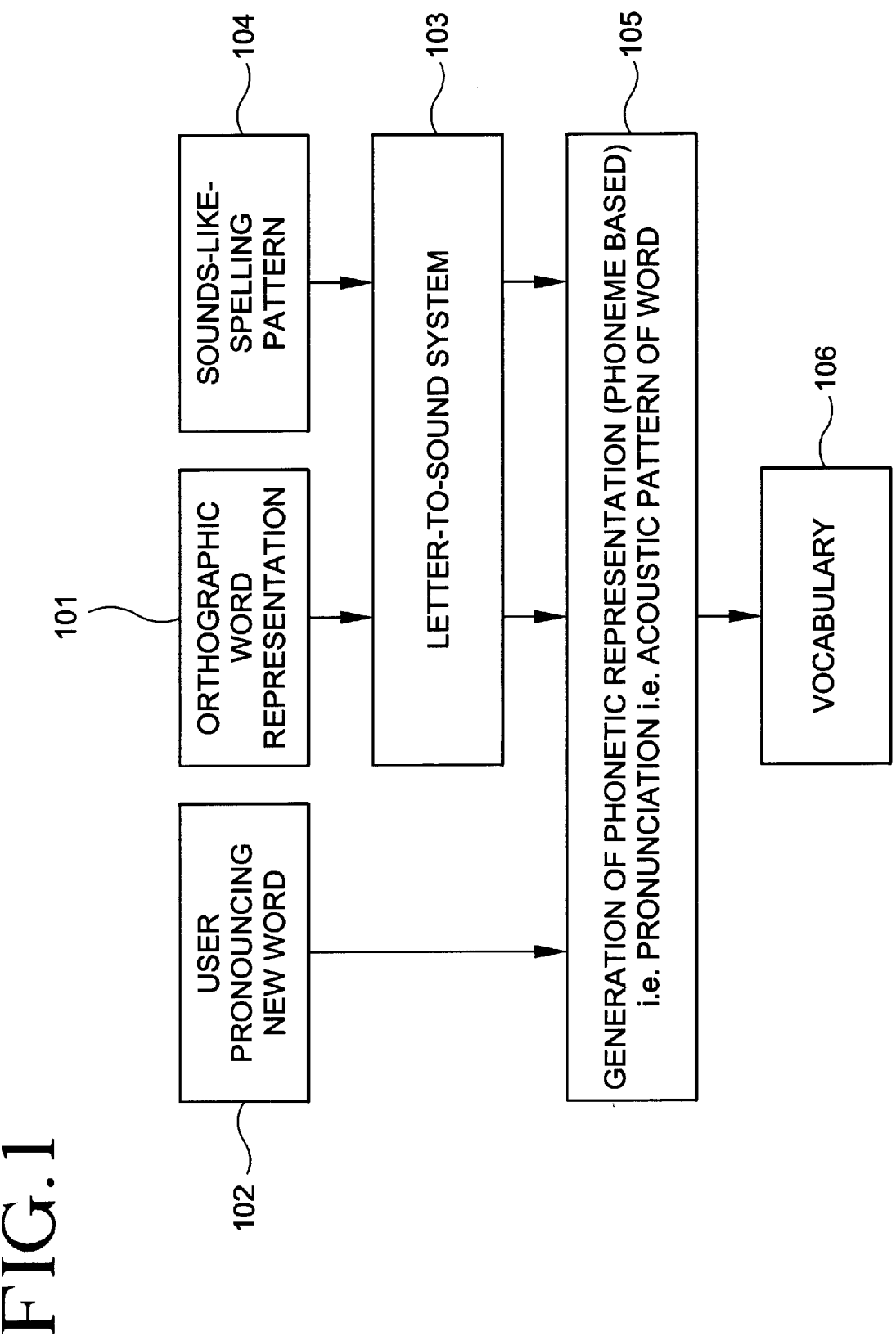
FIG. 1 visualizes the process of adding a new word with yet unseen spelling and pronunciation to the vocabulary of a speech recognition system according to the current state of the art.

In the drawings and specification there has been set forth a preferred embodiment of the invention and, although specific terms are used, the description thus given uses terminology in a generic and descriptive sense only and not for purposes of limitation.

The present invention uses the term "speech system" in its most general meaning comprising speech recognition systems as well as speech synthesis systems.

I. Introduction

One example of a speech recognition system, as described above, offering the possibility to extend and adapt its vocabulary by adding new words is the IBM ViaVoice series of products (for example ViaVoice 98 Executive-, Home- or Office-Edition). As an example, FIG. 1 visualizes the process of adding a new word with yet unseen spelling and pronunciation to the vocabulary of a speech recognition system according to the current state of the art. In these systems, the process of adding a new word encompasses the steps of obtaining from the user the new spelling (101) and the acoustic information of how this spelling is to be pronounced (102). This sound-sample is then used in combination with a statistical system (103), i.e., a LTS system in the current example, mapping letters to sequences of phonemes to ultimately construct a phonetic representation of the newly added word. The statistical system used in this process was built by training it on a predefined large corpus of words obeying the general rules of pronunciation for the language. It generally performs very well for regularly spelled words of the language.

Some words, however, do not follow the standard way of pronunciation for a language. This is especially true of foreign words, words derived from a foreign language, acronyms, abbreviations or proper names. The vocabulary extension process of the ViaVoice product thus allows for the specification of a "sounds-like-spelling" (104), i.e., a pseudo spelling indicating how a word is really to be pronounced, to be used instead of the spelling (101) in these situations. In general, a sounds-like-spelling is a pseudo-spelling describing how another spelling is to be pronounced. For example, for an acronym like "IEEE" in English this might be "eye-triple-ee." The sounds-like-spelling provides the link between the real spelling and the pronunciation. A good sounds-like-spelling proves to be the key for generating the correct pronunciation for irregularly spelled words. Its presence is essential in the construction of a suitable model for the pronunciation. Based on the output generated by the statistical system (103) (from the spelling (101) or the sounds-like-spelling pattern(104)) and the user's pronunciation of the new word (102), a phonetic representation of the new word is generated (105) and finally added to the vocabulary (106).

However, exactly when such a sounds-like-spelling is needed is left up to the user. Omitting it when it is needed may lead to the construction of inferior pronunciation models. Providing it when it is not needed introduces additional effort on the user's side. Furthermore, if it is not needed, the user-interface can be kept simpler and the user will not have be exposed to unneeded complexity. Not providing any mechanism to help with this task puts the onus on the user to determine whether the word to be added indeed follows the standard pronunciation rules or not, and to provide an alternative spelling that does. These rules are not clearly defined and may even vary within subdomains of a language. This approach tends to break down with users who are either not very careful, not very familiar with the language and/or domain or who are not very well versed in phonetics, which is clearly the majority of all users of speech recognition systems.

II. The Solution Based on the Regularity Measure

The present invention provides a method to assess the applicability of a statistical system (like, for instance, a LTS as one example) when adding new words to a large vocabulary speech system like a speech recognition system. More specifically, a solution is provided that allows to estimate the chances of success of a statistical a Letter-to-Sound-System when adding yet unseen spellings to the vocabulary of a speech system.

A basic idea of the present invention is to use a criterion computed over the spelling of the word to be added, to determine whether it is likely to follow the standard rules of pronunciation for the particular language; or more specifically, the standard rules of pronunciation of all the words used to create the statistical system of the speech system. In other words, one could say the criterion answers the question: "Does this word look like anything known and used to build this speech system?" If it does, the present invention assumes that the chances are good that one can create an adequate pronunciation model for the word as this corresponds with the type of words originally used to train the speech system's statistical system. Only in the case the criterion indicates a larger deviation from the known standard rules of the assumed pronunciation, some other method of adding the word to the speech system's vocabulary is to be used. As a preferred method (though not limited to), the invention suggests that the user is prompted to provide a sounds-like spelling pattern. In this situation, the automatic determination of the necessity of prompting for additional information on the pronunciation of a new word (for instance, by a sounds-like spelling pattern) comes as a great help to the user. Employing such a measure has shown to be the key to create good pronunciations while not burdening the user with extraneous tasks (like asking them to always provide such a sounds-like-spelling).

As the present invention allows to estimate the chances of success of the Letter-to-Sound System, it therefore can take appropriate measures if faced with an irregular spelling; to be more precise, the irregularity between spelling and pronunciation. This behavior could also be used up-front when providing a dialog for the user to enter the new word. It can also be kept simple in case a "regular spelling" has been detected. In case one detects some irregular spelling, it is suggested to provide a different interface which prompts the user to enter a sounds-like-spelling, for instance, together with further explanations; as a further possibility (sound) samples could be provided also. However, it is a fundamental approach of the present invention that, as long as this is not really required as indicated by above mentioned criterion, a user will not be exposed to this more complex way of adding a new word to the vocabulary.

The present invention produces a measure to predict if and when it is necessary to provide additional information on the pronunciation such as a sounds-like-spelling when adding a new word to a vocabulary. The inventive teaching starts from the observation that words that generally do not obey the pronunciation rules of a language or domain are likely candidates for such action. The invention therefore develops and uses a model to calculate such a regularity measure and proposes how to use the resulting information in the online process of extending a vocabulary. If the regularity model detects regular spellings, it does not prompt the user for additional information, thus saving an extra step in the process. Spellings which are classified as irregular are treated differently by immediately asking the user for additional information, which in a preferred case is a sounds-like-spelling pattern.

The system automatically measures whether the spelling matches its model of regularity of spelling. This is done by computing, over the new spelling, a score according to a pre-calculated statistical spelling language model (LM). The score is compared to a previously set threshold, which was determined on a corpus of data set aside from building the actual model. If the threshold is not met, a sounds-like spelling is deemed necessary. This information is conveyed to the user who is prompted/forced to provide the pseudo-spelling. Without this mechanism, there is no hint as to when this would help or even be the only means to add a new word. On the other hand, always requiring such a pseudo-spelling would require additional work on the user's part and should only be regarded as a last resort.

As a preferred implementation for the regularity measure, it is suggested to compute the perplexity of the orthographic representation of a word with respect to an N-letter language model. "Perplexity" is an information-theory term relating to the average number of decisions that have to be taken (binary questions that have to be asked) to determine the pronunciation of a letter during the recognition process. Informally, perplexity may be regarded as the average number of following characters that an N-gram character-based language model may have to chose from, given the present history of characters already looked at. Formally, the perplexity is the reciprocal of the geometric average of the probabilities of an hypothesized string of characters. Perplexity is expressed in a number and is an indication of how many different letters are likely to follow a particular context of string of characters.

After the context "interna," the likely characters to follow could be "t" ("international" . . . ), or "l" ("internal"). None of the other 254 ASCII characters will have much probability. Without a language model, the perplexity would be equal to the alphabet size (256 for a spelling vocabulary of the ASCII character set). The language model, greatly reduces the perplexity because it knows the likely letter combinations, without preventing character combinations to be used that it has not seen before.

A "spelling language model" contains a collection of probabilities that one letter follows another. Without such a model, the probability that a specific letter is followed by another is the same for all characters in the alphabet. A language model, as for instance an N-gram model, tries to predict Pr(S), the a priori probability of a character string S occurring in a given language. Theoretically, one would like to predict a new character from an infinitely long history of predecessor characters. Practically, however, these probabilities would be impossible to compute. Thus, a common approach is to approximate all histories by a model which maps all past histories to the same state. Thus, one assumes that the occurrence of a character C is completely determined by the past N characters. Tri-gram models, for instance, use the 2 preceding characters to predict the current character. As the tri-gram frequencies may not be seen frequently enough to allow for good prediction, the tri-gram model is often combined with lower-order models predicting the bi- and uni-gram probabilities.

Thus, according to the suggested powerful criterion, a regularity value is determined by applying the statistical model of the actual language computing the matching of the proposed spelling to a large body of "regular" words of the language. For example, a tri-letter (or in general a N-letter) language model trained over such a large body can be used (actually tri-grams, bi-grams and uni-grams of letters are used in this model), with smoothing factors (weights) to control the influence of each of these 3 sub-models. The smoothing factors can be generated by procedures well-known in the state of the art. As the criterion, the computed perplexity of the proposed spelling with respect to this language model is compared to a threshold value to decide whether the conformity with respect to the pronunciation in said language or language domain is sufficient.

The proposed combination of a statistical-language model, like a tri-letter model for letter frequencies, and the process of generating a sounds-like-spelling when adding a new word to a speech-system results in performance as well as usability improvements; two of the ultimate factors determining the success or failure of a speech-system.

Figure 2:
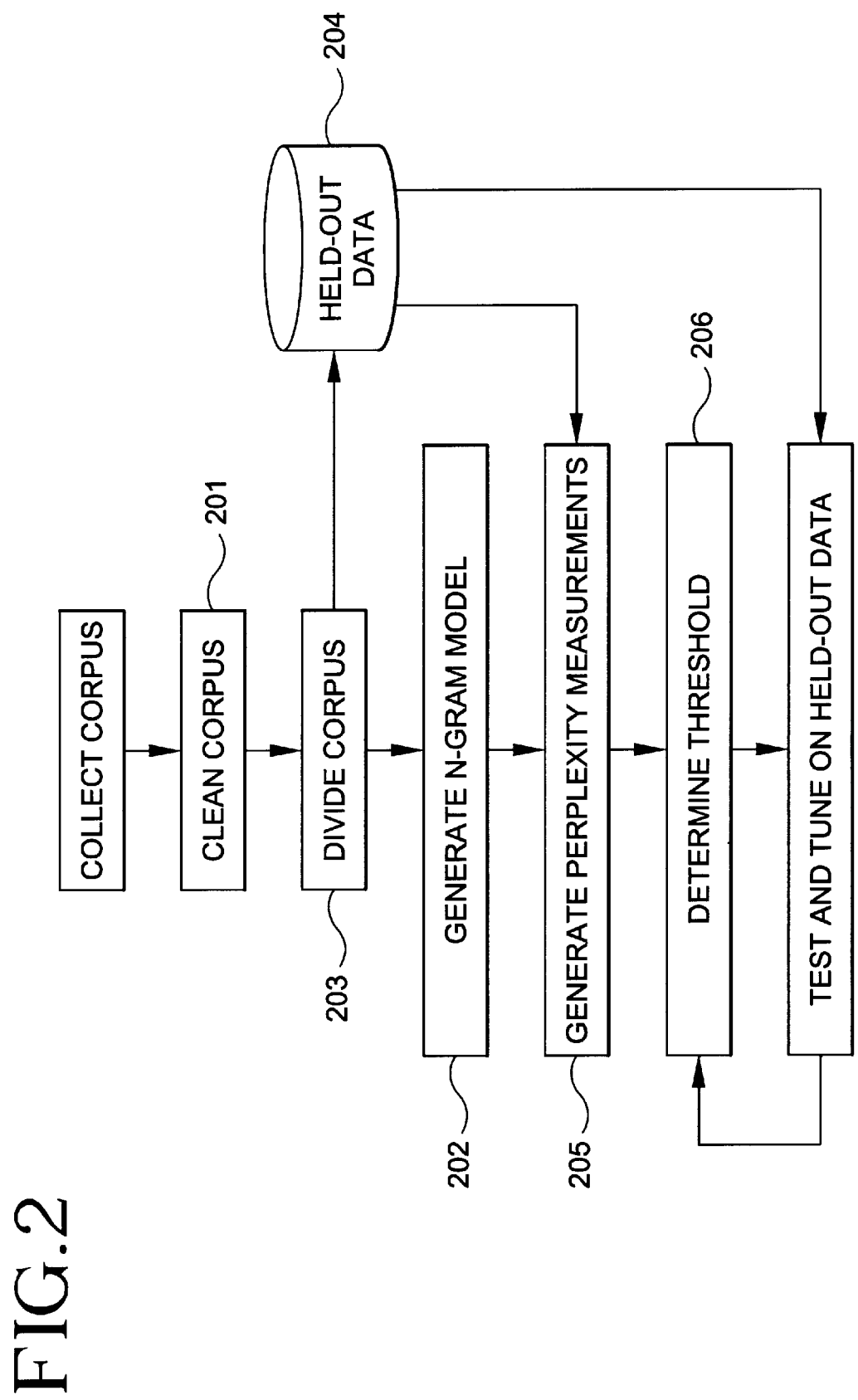
FIG. 2 reflects the process of building a language model forming the base for the determination of the regularity value of a new word to be added to the vocabulary. Moreover within the overall process it is depicted when the determination of the threshold takes place.

III. Language Model for Regularity Measurement and Determination of Threshold With reference to FIG. 2, the following will describe the process of building a spelling language model forming the base for the determination of the regularity value of a new word to be added to the vocabulary.

1. The process starts by collecting a "corpus" (201) of many words deemed to follow the "regular" rules of pronunciation for the particular language. Excluded are, in particular, acronyms ("IBM", "IEEE", etc.), words of foreign descent (e.g., for English "rendez-vous", "Gestalt", etc.), abbreviations ("Mr", "Mrs", "etc.," etc.) and the like.
2. Over this corpus, a statistical model of the sequence of letters present in these words is built according the state of the art. One preferred embodiment is a tri-letter language model (in general, a N-letter language model could be used), computed by counting the number of times letters, and combinations of letters, occur within said corpus.
    a. This model will count uni-letter frequencies, bi-letter frequencies, and tri-letter frequencies, and use these as approximations of the probability of such letter sequences. The construction and functioning of such N-grams models is known within the state of the art.
    b. The overall likelihood of a sequence of 3 letters is computed as a linear combination of the uni-letter, bi-letter and tri-letter likelihoods, with an added offset to give non-zero probabilities to never-observed letter sequences.
    c. The coefficients of the linear combination can be estimated by optimizing the performance of the model over some held-out corpus (204). A state of the art approach for this process can be found in the teaching of F. Jelinek and R. L. Mercer, "Interpolated estimation of Markov Source Parameters from Sparse Data" in "Proc. of the workshop on Pattern Recognition in Practice, North-Holland Publishing Company, 1980, the disclosure of which is incorporated by reference herein.
3. The threshold value of "regularity" is estimated as follows:
    a. A test corpus (204) consisting of new words (not used in training the language model or tuning it) is constituted (203). This test corpus should comprise both "regular" words and "special words," such as acronyms, abbreviations, words borrowed from foreign languages, etc.
    b. For each word in the test corpus, the regularity is scored according to the model (205). For example, for a tri-letter model, the perplexity of each word is computed according to the model.
    c. The words of the test corpus are sorted according to their score (i.e., the perplexity according to the model) building a frequency distribution reflecting, for each regularity value, the corresponding number of words.
    d. This frequency distribution defines a ranking allowing to determine a threshold above which a sounds-like-spelling when adding a word is deemed necessary (206).

The determination of the threshold is based on the following principles. Assuming a representative test sample of spellings, the regular spellings will be distributed normally with regard to their perplexity values according to the generated model. Generally though, they will yield lower perplexity values than the irregular spellings. In the combined distribution which we obtain in step 3 of the above procedure, the intention is to try to locate that perplexity value that best separates irregular from regular spellings. By visually inspecting the frequency distribution and manually selecting a threshold for test purposes, it has been proven that choosing a value in the area where the distribution curve flattens out into high-perplexity values will generally yield good results. Thus, a proposed general approach is to determine for all test words of a test corpus, their regularity values. These values are then used for generating the frequency distribution of said regularity values. Based on said frequency distribution, a reference regularity value can be deduced as that relative maximum corresponding to the lowest conformity (i.e., the highest perplexity value). As has been found out by test scenarios choosing as threshold value a value with lower conformity (i.e., larger perplexity) than said reference regularity value, in general, will yield good results. Of course, the experience and personal judgment of a system builder allows to further adjust a threshold that does neither generate too many false alarms on regular spellings nor let too many irregular spellings pass unnoticed.

Figure 3:
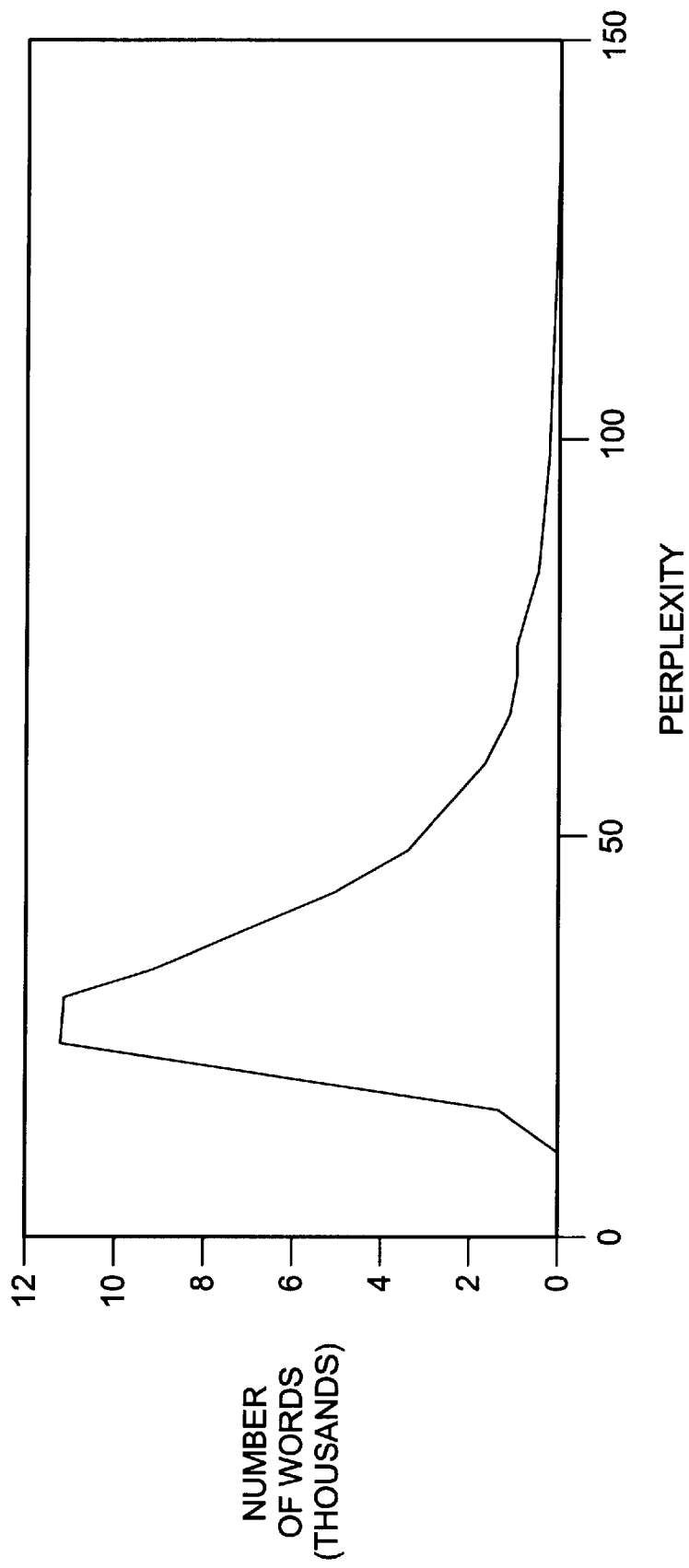
FIG. 3 visualizes a typical set of perplexity value distributions over a large set of samples. As can be seen, the curve tapers out towards the high-perplexity end. According to the present invention, this defines the zone best suited to set the threshold this approach is based upon.

This situation is visualized in FIG. 3., which shows a typical set of perplexity value distributions over a large set of samples based on the perplexity measurements for a French data set using a tri-letter language model (LM). Near a perplexity value of 30, the frequency distribution shows a relative maximum. As can be seen, the curve smoothes out towards the high-perplexity end. According to the present invention, this defines the zone best suited to set the threshold this approach is based upon; i.e., values for the threshold larger than that of the relative maximum are good candidates which separate irregular from regular spellings.

IV. Adding a New Word at Runtime

Figure 4:
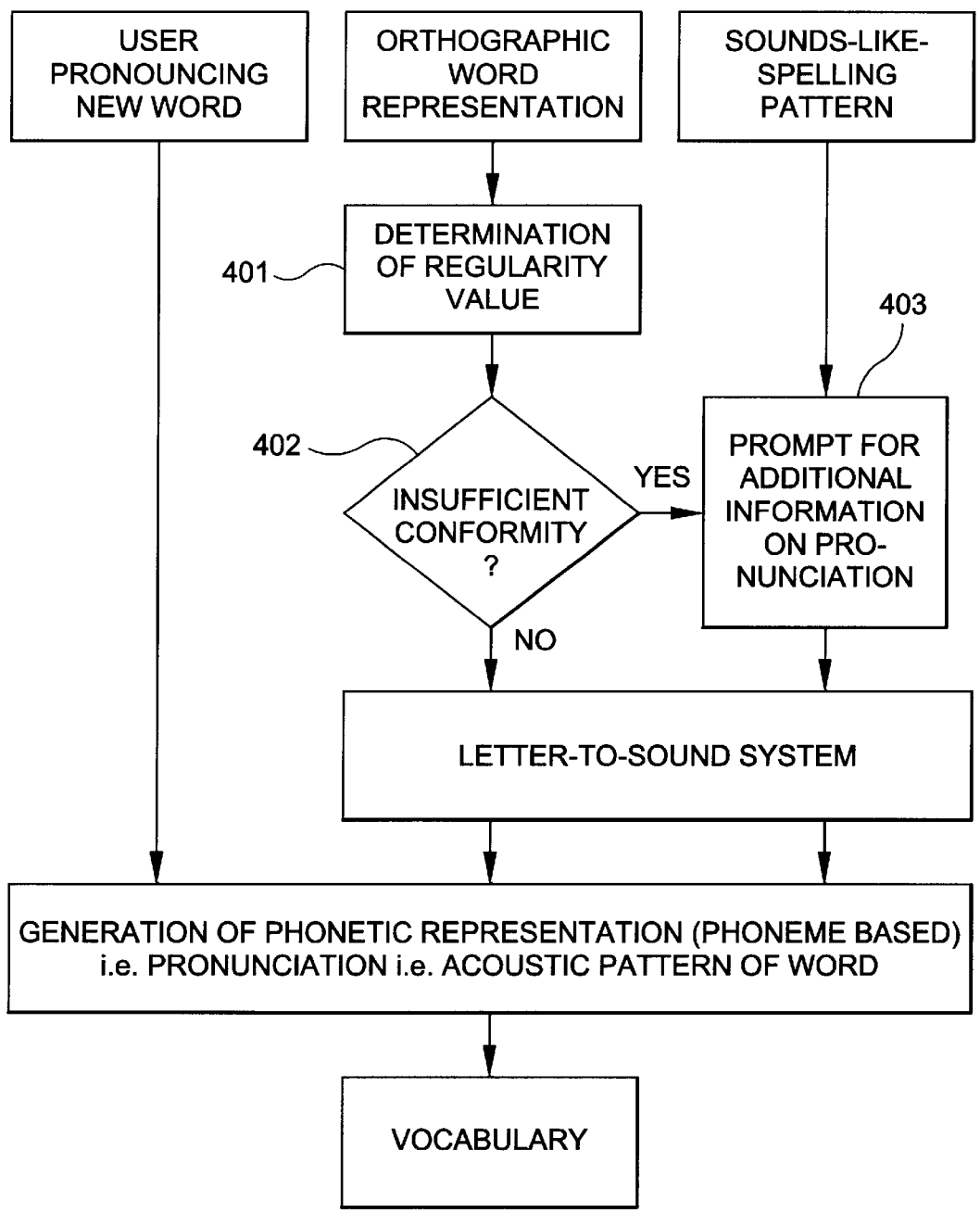
FIG. 4 shows, in a contrasting view with respect to FIG. 1, the process of adding a new word with yet unseen spelling and pronunciation to the vocabulary of a speech recognition system according to the present invention.

FIG. 4. shows, in a contrasting view with respect to FIG. 1, the process of adding a new word with yet unseen spelling and pronunciation to the vocabulary of a speech recognition system according to the present invention.

At runtime, when the user tries to add a new word, the following steps are performed:

1. For the new word a matching measure, its regularity value, of the word spelling with respect to the model is calculated (401). In the case of our tri-letter language model, this is computed as the perplexity of the orthographic representation of the word.

2. If the perplexity is above the threshold determined above indicating an insufficient conformity (402) with respect to the pronunciation of said language (domain), the user is informed that this word probably does not follow the usual rules for pronunciation, and given opportunity to enter a sounds-like spelling that does (403). In this case, the sounds-like spelling is used in the generation process of the phonetic representation.

Before giving an example of the above-described methodologies, it should be appreciated that the methodologies described herein may be implemented on one or more computer systems. For example, such a computer system may include a processor, for controlling and performing the above-described operations, coupled to a memory and input/output devices. It is to be appreciated that the term "processor" as used herein is intended to include any processing device, such as, for example, one that includes a CPU (central processing unit) or other suitable processing circuitry. The processor may also include a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the phrase "input/output devices" as used herein is intended to include, for example, one or more input devices, e.g., keyboard and/or microphone, for inputting data to the processing unit, and/or one or more output devices, e.g., CRT display, speaker and/or printer for providing results associated with the processing unit.

Accordingly, computer software including instructions or code for performing the methodologies described herein may be stored in one or more of the associated memory devices (e.g., ROM, fixed or removable memory) and, when ready to be utilized, loaded in part or in whole (e.g., into RAM) and executed by a CPU. In any case, it should be understood that these operations may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

V. An Example

It is assumed a user might want to add the word "IEEE" to the vocabulary as it is not part of the predefined set of words. Its actual pronunciation "eye-triple-e" differs considerably from the way the word would be pronounced if one were to pronounce the sequence of letters in a "regular" way. Using the statistical mapping of letter-to-sound system and the user's utterance without taking care could result in producing a phonetic representation that starts with the vowel "i" followed a long vowel "e." Depending on the sound-quality that is being fed into the adding process and the quality of the matcher, this pronunciation may even pass a sanity check and become part of the user's vocabulary. In that case, not only will it hardly ever be recognized when it is uttered by the user, it will also hurt the overall recognition process by being recognized in the wrong places as the distorted model may match well in other, unwanted places. Using the proposed regularity value scoring method on the spelling, the system can prompt the user to provide a sounds-like-spelling for the actual word. This (after checking if it follows the rules of standard pronunciation) can the be used safely to generate an appropriate model of the pronunciation.

VI. Further Extensions

The teaching outlined above can be extended in various directions. The above scenario describes the application of the invention primarily with respect to a certain natural language. However, the model clearly also lends itself to any subset of a language or language domain. If, for instance, the speech-recognition system were crafted for a special domain, words outside this particular domain (but otherwise perfectly part of the actual language) could be detected and appropriate actions taken when adding them to the vocabulary. Thus, this extension makes the invention applicable to a multitude of language domains.

If the comparison of the regularity value with the threshold value indicates that the conformity with the standard pronunciation is insufficient, the prompting for additional information on the pronunciation of said word is not limited to a sounds-like-spelling pattern. The invention allows that actually any type of additional information increasing the reliability with respect to the pronunciation can be gathered.

The speech system might even ask the user for some type of additional and direct acoustic input.

As a further extension, instead of a single threshold, alternatively, a set of thresholds may be used to decide whether the new word is likely to follow the standard rules of pronunciation for the particular language. A first threshold could be used according to the lines described above to detect "very regular" words that will certainly not need any modifications. A second threshold (relating to a lower degree of conformity with the standard pronunciation) could indicate that additional measures like a sounds-like-spelling are definitely needed. Words whose scores fall in between these two thresholds may be handled by automatic modifications to the spellings. A possible embodiment could apply a set of matching rules transforming the spelling into a "more regular" spelling. The rules could be prefabricated and be used to model typical problematic letter combinations like certain known endings of foreign words.

By observing the development of the perplexity (or analogously, the log-likelihood) score across the word, it may be possible to identify the problematic sequences of letters. In a further embodiment of the present invention, this information can be used to explicitly bring to the user's attention exactly which part of the new word causes the problem. This portion of the word then has to be treated differently, e.g., by using a sounds-like-spelling to describe its pronunciation. More specifically, the scoring can even happen dynamically while the new word is being entered. Once an irregularity is detected, this can immediately be acted upon, e.g., by prompting the user for an alternative description.

Clearly, as mapping letters to sounds is also one of the core activities of any Text-To-Speech system, the suggested scoring model can be used to detect irregular spellings when presented to the TTS system. This would allow the TTS to employ different strategies according to the type of word that is being transcribed. If several systems are available, the calculated score could be used to determine which one to choose.

So far as the measure to determine regularity, the "perplexity" with respect to the language model has been exploited. However, other related measures like "log-probability" lend themselves also to such a modeling. Perplexity and log-probability may be regarded as two sides of the same coin measuring complementary aspects. Log-probability measures the average weighted probability of the letter combinations occurring in a word, while entropy measures the average uncertainty of the letter-sequences. In other words, the proposed regularity measure may be expressed in terms of the log-probability or the perplexity.

In a modular approach, the inventive teaching can be applied to a multitude of candidate vocabularies of a multitude of languages or language domains. For instance, the spelling of a new word can be run against a regular model (say general German) and also against a model built from Latin spellings (say for a special medical domain) computing a multitude of regularity values corresponding to the individual vocabularies. In case of the above example, the word is of Latin origin, the latter model will score higher on the new word and should be the one of choice to generate a pronunciation. Having several such models at hand and applying them in parallel is very valuable for special domains, such as the legal and medical domains.

VII. Advantages of the Invention

The present invention provides an automatic determination of the regularity of a proposed word with respect to the standard pronunciation of the language. This lowers the requirement for attention and skills on the user's part in the extension process of a vocabulary. It is neither left up to the user when additional information concerning the pronunciation of a new word are to be introduced to the speech system, nor is this additional information omitted when it is needed. Otherwise, in both cases, the construction of inferior pronunciation models would be the consequence. As the recognition accuracy is strongly dependent on the quality of these models, the inventive teaching results in an improved overall performance and higher recognition accuracy of the speech system. The quality of the generated pronunciations in speech systems is improved.

Furthermore, as a user's involvement by prompting him for additional information with respect to the pronunciation is reduced to a minimum, the user-interface can be kept simpler and the user will not have to be exposed to unneeded complexity. As words likely to be pronounced in a standard way do not require further action, valuable time-savings are the result. This is a major selling argument for typical clients using speech-recognition systems such as lawyers and medical doctors.

The present invention is inherently language and domain independent and may thus be applied to a variety of languages and domains without further extension. This property is of specific advantage in view of the large number of different languages and language domains which all can be supported with a single solution approach.

Finally, the reduced number of failures during adding new words to a vocabulary leads to reduced user frustration and an improved perception of system usability.

Using as regularity value, the computed perplexity of the spelling of said word with respect to a language model turned out to be a very effective measure for the likeliness of the regularity of the pronunciation. It has been determined that this statistical approach deals very well with unknown words and generalizes well on yet unseen data. It is better suited than rule-based approaches for such problems.

Prompting a sounds-like-spelling pattern representing the pronunciation of said new word as additional information on the pronunciation is a powerful approach to which users are used to and which is accepted by users.

Also the exploitation of a letter-to-sound system together with the additional information specified by the user for the derivation the acoustic pattern of said new word is beneficial in two aspects: it furnishes good pronunciation results and allows for a maximum of automatism in the derivation process.

Various tests have shown that the suggested methodology for determining the threshold value results in a value that best separates the regular from the irregular pronunciations. Moreover, as a lot of data to be used as a corpus of test words to train the system is readily available, the threshold value can be adjusted to an effective value by using a large corpus of test words.

Finally, due to the present invention's flexibility, it can be exploited for all types of speech systems comprising speech recognition systems as well as speech synthesis systems.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of adding a new word to a vocabulary of a speech system, the vocabulary including words and corresponding acoustic patterns for a language or a language domain, the method comprising the steps of:
   determining, for the new word, a regularity value measuring a conformity with respect to a pronunciation in the language or the language domain;
   comparing the regularity value to a threshold value to determine a sufficiency of the conformity;
   prompting for additional information on the pronunciation of the new word, when the conformity is insufficient; and
   adding the new word and an acoustic pattern of the new word to the vocabulary.

2. The method of claim 1, wherein the regularity value is based on one of a computed perplexity and a computed log-probability of the spelling of the word with respect to a spelling language model.

3. The method of claim 2, wherein the language model is determined according to N-gram statistics.

4. The method of claim 1, wherein the additional information comprises a sounds-like-spelling pattern representing the pronunciation of the new word.

5. The method of claim 1, wherein the added acoustic pattern is derived from the additional information and from the pronunciation of the new word generated by a letter-to-sound system.

6. The method of claim 1, wherein the comparing step comprises the steps of:
   determining regularity values for test words of a test corpus of words not part of the vocabulary;
   determining a frequency distribution of the regularity values;
   determining, from the frequency distribution, a reference regularity value as a relative maximum corresponding to the lowest conformity; and
   choosing, as a threshold value, a value with a lower conformity than the reference regularity value.

7. The method of claim 1, wherein the determining step further comprises determining a multitude of regularity values with respect to a multitude of candidate vocabularies such that a selected vocabulary is chosen as the candidate vocabulary for which the regularity value indicates the largest conformity, and further wherein the added acoustic pattern is derived using the selected vocabulary.

8. The method of claim 1, wherein the speech system is one of a speech recognition system and a speech synthesis system.

9. Apparatus for adding a new word to a vocabulary of a speech system, the vocabulary including words and corresponding acoustic patterns for a language or a language domain, the apparatus comprising:

at least one processor operative to: (i) determine, for the new word, a regularity value measuring a conformity with respect to a pronunciation in the language or the language domain; (ii) compare the regularity value to a threshold value to determine a sufficiency of the conformity; (iii) prompt for additional information on the pronunciation of the new word, when the conformity is insufficient; and (iv) add the new word and an acoustic pattern of the new word to the vocabulary.

10. The apparatus of claim 9, wherein the regularity value is based on one of a computed perplexity and a computed log-probability of the spelling of the word with respect to a spelling language model.

11. The apparatus of claim 10, wherein the language model is determined according to N-gram statistics.

12. The apparatus of claim 9, wherein the additional information comprises a sounds-like-spelling pattern representing the pronunciation of the new word.

13. The apparatus of claim 9, wherein the added acoustic pattern is derived from the additional information and from the pronunciation of the new word generated by a letter-to-sound system.

14. The apparatus of claim 9, wherein the comparing operation comprises the steps of: (i) determining regularity values for test words of a test corpus of words not part of the vocabulary; (ii) determining a frequency distribution of the regularity values; (iii) determining, from the frequency distribution, a reference regularity value as a relative maximum corresponding to the lowest conformity; and (iv) choosing, as a threshold value, a value with a lower conformity than the reference regularity value.

15. The apparatus of claim 9, wherein the determining operation further comprises determining a multitude of regularity values with respect to a multitude of candidate vocabularies such that a selected vocabulary is chosen as the candidate vocabulary for which the regularity value indicates the largest conformity, and further wherein the added acoustic pattern is derived using the selected vocabulary.

16. The apparatus of claim 9, wherein the speech system is one of a speech recognition system and a speech synthesis system.

17. An article of manufacture for adding a new word to a vocabulary of a speech system, the vocabulary including words and corresponding acoustic patterns for a language or a language domain, comprising a machine readable medium containing one or more programs which when executed implement the steps of:

determining, for the new word, a regularity value measuring a conformity with respect to a pronunciation in the language or the language domain;

comparing the regularity value to a threshold value to determine a sufficiency of the conformity;

prompting for additional information on the pronunciation of the new word, when the conformity is insufficient; and adding the new word and an acoustic pattern of the new word to the vocabulary.

18. The article of claim 17, wherein the regularity value is based on one of a computed perplexity and a computed log-probability of the spelling of the word with respect to a spelling language model.

19. The article of claim 18, wherein the language model is determined according to N-gram statistics.

20. The article of claim 17, wherein the additional information comprises a sounds-like-spelling pattern representing the pronunciation of the new word.

21. The article of claim 17, wherein the added acoustic pattern is derived from the additional information and from the pronunciation of the new word generated by a letter-to-sound system.

22. The article of claim 17, wherein the comparing step comprises the steps of:

determining regularity values for test words of a test corpus of words not part of the vocabulary;

determining a frequency distribution of the regularity values;

determining, from the frequency distribution, a reference regularity value as a relative maximum corresponding to the lowest conformity; and choosing, as a threshold value, a value with a lower conformity than the reference regularity value.

23. The article of claim 17, wherein the determining step further comprises determining a multitude of regularity values with respect to a multitude of candidate vocabularies such that a selected vocabulary is chosen as the candidate vocabulary for which the regularity value indicates the largest conformity, and further wherein the added acoustic pattern is derived using the selected vocabulary.

24. The article of claim 17, wherein the speech system is one of a speech recognition system and a speech synthesis system.

* * * * *